(12) United States Patent
Brandley et al.

(10) Patent No.: US 11,479,305 B2
(45) Date of Patent: Oct. 25, 2022

(54) MODULAR STRUCTURAL COMPOSITES FOR AUTOMOTIVE APPLICATIONS

(71) Applicant: Bridgestone Americas, Inc., Nashville, TN (US)

(72) Inventors: Mark W. Brandley, Franklin, TN (US); Georg Kasmeier, Munich (DE); Adam Halsband, Birmingham, MI (US); Adam Harms, St. Louis, MO (US); Johannes Klug, Munich (DE)

(73) Assignee: Bridgestone Americas, Inc., Nashville, TN (US)

( * ) Notice: Subject to any disclaimer, the term of this patent is extended or adjusted under 35 U.S.C. 154(b) by 0 days.

(21) Appl. No.: 17/258,081

(22) PCT Filed: Jul. 24, 2019

(86) PCT No.: PCT/US2019/043220
§ 371 (c)(1),
(2) Date: Jan. 5, 2021

(87) PCT Pub. No.: WO2020/023624
PCT Pub. Date: Jan. 30, 2020

(65) Prior Publication Data
US 2021/0284246 A1    Sep. 16, 2021

Related U.S. Application Data

(60) Provisional application No. 62/702,428, filed on Jul. 24, 2018.

(51) Int. Cl.
*B60J 7/00* (2006.01)
*B62D 25/20* (2006.01)
*B62D 29/04* (2006.01)

(52) U.S. Cl.
CPC ........... *B62D 25/20* (2013.01); *B62D 29/043* (2013.01); *B62D 29/048* (2013.01)

(58) Field of Classification Search
CPC ... B32B 15/016; B32B 27/08; Y10S 428/926; Y10S 428/925; B22F 7/04; H04L 5/0053;
(Continued)

(56) References Cited

U.S. PATENT DOCUMENTS

| | | | |
|---|---|---|---|
| 4,377,614 A | 3/1983 | Alfter et al. | |
| 5,139,843 A | 8/1992 | Murakami et al. | |

(Continued)

FOREIGN PATENT DOCUMENTS

| | | |
|---|---|---|
| CN | 101678615 A | 3/2010 |
| CN | 101678617 A | 3/2010 |

(Continued)

OTHER PUBLICATIONS

The Supplementary European Search Report and Written Opinion issued in corresponding application, EP 19 84 0592; dated Mar. 15, 2022.

(Continued)

*Primary Examiner* — Kiran B Patel
(74) *Attorney, Agent, or Firm* — Shaun J. Fox; J. Gregory Chrisman

(57) ABSTRACT

A modular composite structure containing multiple individual composite structures attached together. The individual composite structures form sections of a vehicle component. The composite structures are lightweight and made of materials that can function to absorb energy or attenuate vibration or noise. The composite structures contain a core material adhered to a fiber layer and a fiber reinforcement region for improving the strength and stiffness of the modular composite structure. The modular composite structure can include multiple floor pan segments (Continued)

that can be attached to a central composite structure that can be a utility tunnel or housing.

16 Claims, 3 Drawing Sheets

(58) Field of Classification Search
CPC ...... G03G 5/0618; G03G 5/071; Y02E 60/10; B01J 2531/845
See application file for complete search history.

(56) References Cited

U.S. PATENT DOCUMENTS

| | | | |
|---|---|---|---|
| 5,667,866 | A | 9/1997 | Reese, Jr. |
| 6,331,028 | B1 | 12/2001 | O'Neill et al. |
| 6,375,249 | B1* | 4/2002 | Stanton ............... B61D 17/041 296/178 |
| 6,627,018 | B1 | 9/2003 | O'Neill et al. |
| 6,748,876 | B2 | 6/2004 | Preisler et al. |
| 7,087,296 | B2 | 8/2006 | Porter |
| 7,601,654 | B2 | 10/2009 | Bhatnagar et al. |
| 7,759,267 | B2 | 7/2010 | Conover et al. |
| 7,784,856 | B2 | 8/2010 | Fuchs et al. |
| 7,785,694 | B2 | 8/2010 | Muller et al. |
| 8,568,853 | B2 | 10/2013 | Raghavendran et al. |
| 8,595,699 | B2 | 11/2013 | O'Carroll et al. |
| 9,421,923 | B1* | 8/2016 | Singh ................... B60R 13/083 |
| 9,527,268 | B2 | 12/2016 | Preisler et al. |
| 9,783,233 | B2 | 10/2017 | Brown |
| 2003/0118806 | A1 | 6/2003 | Schonebeck |
| 2007/0114816 | A1 | 5/2007 | Hoelzel et al. |
| 2007/0238378 | A1 | 10/2007 | Conover et al. |
| 2007/0269645 | A1 | 11/2007 | Raghavendran et al. |
| 2008/0038510 | A1 | 2/2008 | Perret et al. |
| 2009/0091159 | A1* | 4/2009 | Gerish .................. B21D 53/88 296/193.07 |
| 2009/0252921 | A1 | 10/2009 | Bottler et al. |
| 2014/0302285 | A1 | 10/2014 | Ikeji et al. |
| 2015/0137560 | A1 | 5/2015 | Preisler et al. |
| 2015/0145276 | A1 | 5/2015 | Preisler et al. |
| 2015/0222011 | A1 | 8/2015 | Kolak et al. |
| 2016/0207547 | A1 | 7/2016 | Valverde et al. |
| 2017/0072656 | A1 | 3/2017 | Dodworth |

FOREIGN PATENT DOCUMENTS

| | | |
|---|---|---|
| CN | 104039595 A | 9/2014 |
| DE | 10 2011 119 535 A1 | 5/2013 |
| DE | 10 2012 010 463 A1 | 11/2013 |
| EP | 1 520 770 B1 | 4/2009 |
| EP | 1784301 B1 | 4/2015 |
| JP | 2008-94146 A | 4/2008 |
| WO | 2009040864 A1 | 4/2009 |

OTHER PUBLICATIONS

The International Search Report and Written Opinion issued in corresponding application, PCT/US2019/043220; dated Nov. 8, 2019.

* cited by examiner

MODULAR STRUCTURAL COMPOSITES FOR AUTOMOTIVE APPLICATIONS

TECHNICAL FIELD

The present disclosure relates to modular structural composites for use as vehicle body parts and, in particular, to modular, reinforced structural composites for use as a segmented floor pan and utility tunnel in a vehicle.

BACKGROUND

Composite structures that utilize many different materials are used in a variety of applications that warrant increased strength, such as high bending stiffness, and reduced weight. Automotive applications employ composite materials to reduce vehicle weight and provide desirable stiffness to body parts and panels. Materials often used in the composite structures include reinforcing fibers, resins and plastics. For example, motor vehicle floor designs and body panels can include molded compounds that include thermosetting plastic material having reinforcing fibers such as glass fibers mixed in.

There exists a need among automotive manufacturers for structural composites that are stiff enough to resist bending yet strong enough to absorb energy without increasing part weight. It is also desirable that the structural composites are easily manufactured at a relatively low cost. The present invention employs a combination of materials that provide a lightweight design that effectively attenuates vibration and sound, is strong enough to resist bending and can absorb energy in a controlled manner.

SUMMARY

In a first aspect, disclosed is a modular composite structure that includes a first molded composite core structure having a first core having a first surface, the first surface of the first core being bonded to a first fiber layer embedded in a first polymer, and a first fiber reinforcement region overlying a portion of the first surface of the first core. The modular composite structure further includes a second molded composite core structure having a second core having a first surface, a first fiber substrate, the first fiber substrate including fibers embedded in a second polymer, the first fiber substrate being bonded to a first surface of the second core, and a second fiber reinforcement region being bonded to and overlying a portion of the first fiber substrate, wherein the first molded composite core structure is attached to the second molded composite core structure. The first core and second core are composed of at least one of honeycomb, solid thermoplastic material or foam.

In an example of aspect 1, the first molded composite core structure includes a central area of increased thickness along its length, and the first fiber reinforcement region overlies the central area of increased thickness of the molded composite core structure. The central area of increased thickness is formed of one or multiple cores stacked on top or overlying one another. For example, the area of increased thickness is composed of 2 to 5 cores, wherein the multiple cores include a first core that extends beyond the area of increased thickness.

In another example of aspect 1, the first fiber reinforcement region is embedded in the first polymer and the second fiber reinforcement region is embedded in the second polymer, wherein the first polymer and the second polymer can be the same material.

In another example of aspect 1, the first fiber reinforcement region overlies the first fiber layer, and a portion of the first fiber layer is in direct contact with the first core.

In another example of aspect 1, the first fiber layer overlies the first fiber reinforcement region such that a portion of the first fiber reinforcement region is in direct contact with the first surface of the first core.

In another example of aspect 1, the modular composite structure includes a third molded composite core structure, the third molded composite core structure being attached to the second molded composite core structure such that the second molded composite core structure separates the first and the third molded composite structures.

In another example of aspect 1, the first modular composite is a lower structure part for a vehicle.

In another example of aspect 1, the first molded composite core structure is a floor pan section and the second molded composite core structure is a U-shaped utility tunnel for a vehicle.

In another example of aspect 1, the third molded composite core structure is a floor pan section.

In another example of aspect 1, the first molded composite core structure is segmented in that the first molded composite core contains a first core section and a second core section.

In another example of aspect 1, the first molded composite core structure is a ribbed core, wherein the ribbed core has a free second surface not in contact with a fiber layer, for example, the free second surface is directly opposed to the first surface that is bonded to the first fiber layer.

In another example of aspect 1, the ribbed core includes a molded thermoplastic resin, wherein the thermoplastic material resin is a long fiber reinforced thermoplastic having fibers that can range from 5 mm to 100 mm or more.

In a second aspect, there is a modular composite lower structure for a vehicle that includes a first molded composite floor pan segment having a first core that has a first surface and a central area of increased thickness along its length, the first surface of the first core being bonded to a first fiber layer embedded in a first polymer, and a first fiber reinforcement region embedded in the first polymer, the first fiber reinforcement region overlies a portion of the central area of increased thickness of the first core. The central area of increased thickness is formed of one or multiple cores stacked on top or overlying one another. For example, the area of increased thickness is composed of 2 to 5 cores, wherein the multiple cores include a first core that extends beyond the area of increased thickness. The modular composite lower structure further includes a U-shaped utility structure that includes a second core having a first surface, a first fiber substrate, the first fiber substrate containing fibers embedded in a second polymer, the first fiber substrate being bonded to the first surface of the second core, and the first fiber substrate having a horizontal center portion and two substantially vertical portions on each side of the horizontal center portion; and a second fiber reinforcement region bonded to and overlying the horizontal center portion of the first fiber substrate, wherein the first molded composite floor pan structure is attached to the U-shaped utility structure. The first core and second core are composed of at least one of honeycomb, solid thermoplastic material or foam.

In an example of aspect 2, the second fiber reinforcement region extends to overlie a portion of the two substantially vertical portions of the first fiber substrate.

In another example of aspect 2, the U-shaped utility structure has a first end and a second end, the first end of the U-shaped utility structure being attached to the first molded composite floor pan structure.

In another example of aspect 2, the second end of the U-shaped utility structure is attached to a second molded composite floor pan structure, wherein the U-shaped utility structure separates the first molded composite floor pan structure and the second molded composite floor pan structure.

In another example of aspect 2, the first core is segmented such that the first core includes a first core section and a second core section.

In another example of aspect 2, the first core is a ribbed core, wherein the ribbed core comprises a free second surface not bonded to another layer.

In another example of aspect 2, the ribbed core is made of a molded thermoplastic resin.

In another example of aspect 2, the central area of increased thickness of the first core has a horizontal surface portion and two substantially vertical surfaces on each side of the horizontal surface portion, the first fiber reinforcement region overlies the horizontal surface portion of the central area of increased thickness.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
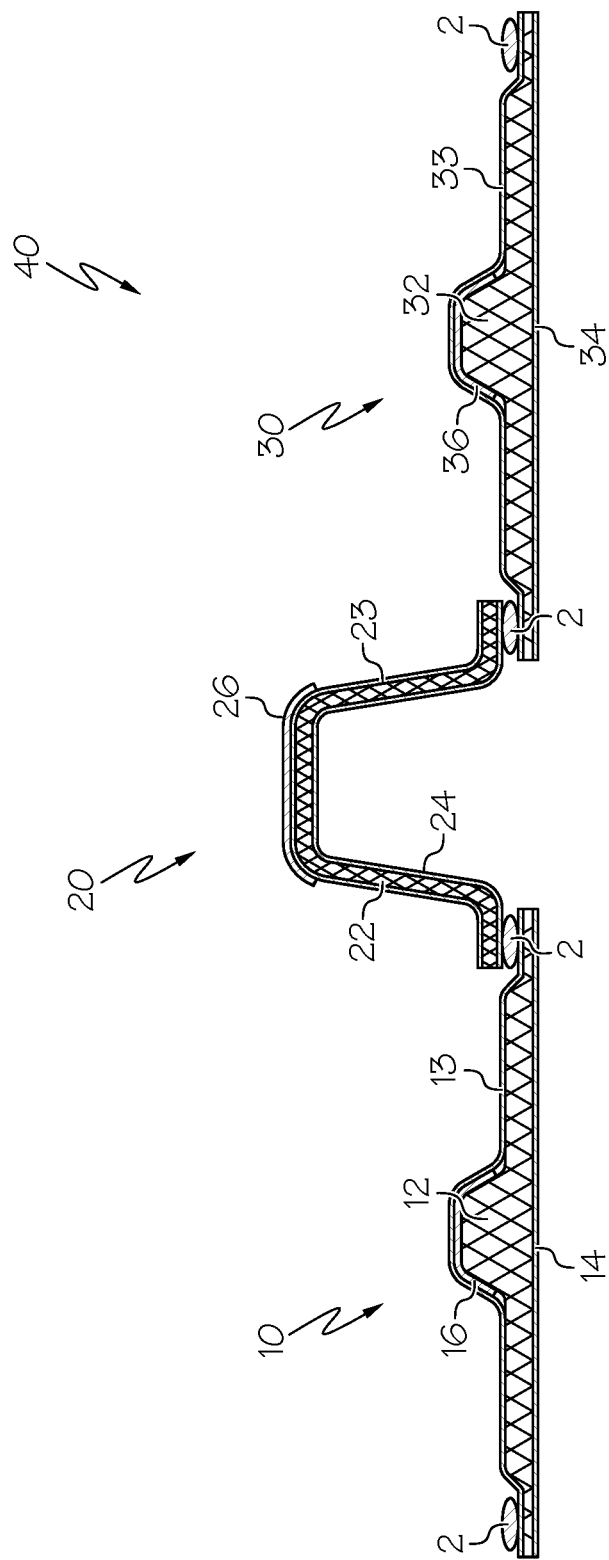
FIG. 1 shows a cross-section view of a modular structural composite of a vehicle floor pan with a transmission tunnel.

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably less than or not more than 25. In an example, such a range defines independently 5 or more, and separately and independently, 25 or less.

The terms "substantial," "substantially," and variations thereof as used herein are intended to note that a described feature is equal or approximately equal to a value or description. For example, a "substantially planar" surface is intended to denote a surface that is planar or approximately planar. It also is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The present disclosure relates to modular composite structures that can be used as components or elements in a variety of structures or applications. For example, the modular composite structures can be used in automotive applications and can be a structural or frame component, a lower structure component, flooring component, body panel, bed component (e.g., a truck bed component) or the like in a vehicle (e.g., passenger vehicle, car, truck, bus, tractor, all terrain vehicle, motorcycle). In some embodiments, the modular composite structures can be a floor pan or segment thereof or a utility throughput or tunnel or segment thereof. Floor pans can be part of a lower structure for a passenger vehicle and a utility tunnel can function to provide a housing for various vehicle parts, e.g., wiring, transmission parts, connecters, couplings, etc. The modular composite structures can be connected or attached to one another to form a multi-component modular structure in a vehicle, for example, a segmented floor pan and utility tunnel structure.

The modular composite structures can generally have increased stiffness that resists bending and torsion of the structures and are relatively lightweight. In one or more embodiments, the modular composite structures can further have an energy-absorbing component, for example, a crushable thermoplastic core. The energy-absorbing component is preferably strong enough to absorb energy and deflect it from being sent to a passenger or other structural components in the vehicle. The modular composite structures can also have one or more components that effectively attenuate noise, vibration or a combination thereof. Preferably, the modular composite structures are lightweight, stiff and include a component for absorbing energy and reducing noise and/or vibration in the vehicle. Other advantages of the modular composite structures can include being easily formable into a desirable shape by conventional molding methods that preferably use low or moderate pressure and heat, which advantageously lowers time and cost to manufacture the structures.

The individual composite structures of the overall modular or multi-component composite structure can be identical or substantially similar to one another (e.g., a near mirror image of a structure to be attached to). In an example, a floor pan can be segmented into two or more sections, wherein each section is formed by a composite structure having similar materials and/or design as the other section or sections and can form an overall floor pan design when attached together. In one or more embodiments, a pair of individual composite structures can be different from one another. For example, a floor pan or section thereof can be attached to another component, such as a non-floor pan composite structure (e.g., a utility tunnel). In one or more embodiments, individual composite structures are attached to one another to form the final modular composite structure, which can include two or more composite structures or 2 to 10 composite structures. The individual composite structures can be attached to one another by conventional methods, for example, using an adhesive or epoxy, fastener (e.g., screw, bolt, clip) or welding.

The individual composite structures can have similar components that can be made of the same or similar materials. For example, the composite structures can have a fiber-containing layer at least partially adhered to a core structure or material having select reinforced areas or regions thereon. The reinforced areas provide increased stiffness to resist loading, bending and torsion forces acting on the composite structure. In one or more embodiments, the reinforced regions can be positioned at a central area of the composite structure. The fiber layers and fiber reinforcement regions of various individual composite structures can be made of the same or similar materials to reduce material and manufacturing costs. Similarly, when recycled materials can be substituted, for example, for fibers in the fiber layers, such materials can be used to further reduce manufacturing costs and promote sustainability.

One or more embodiments further include methods for fabricating and manufacturing individual and modular composite structures. For example, a fiber layer can be positioned or applied on a surface or multiple surfaces of a core material (e.g., a first surface) to form a blank. Reinforcement fibers, for example in the form of a patch, can be applied at select areas onto the surface of the core material or applied fiber layer(s) on the core material. Reinforcement fibers can be selectively applied in a roving method onto the exposed surface of the fiber layer and/or core material. A roving method can include a rotating table to move the composite structure to a desired fiber application area wherein the reinforcement fibers (e.g., in strips of unidirectional fiber) can be applied (e.g., with a mechanical applicator) to select surface areas of the blank. A curable material (e.g., resin) can be sprayed, poured, spread, rolled, brushed or calendared onto the fiber layer and reinforcement fibers to coat and embed the fibers in the curable material to form a pre-form composite. Under heated conditions, the pre-form composite can be molded (e.g., in a compression or press mold or similar tooling) to form the final shape of the composite structure.

Molding conditions such as temperature and pressure can be adjusted as needed but are preferably low to moderate to reduce time and cost of manufacturing the composite structure. For example, the structure can be heated during molding to a temperature in the range of about 100° to about 200° C., about 110° to about 190° C., about 120° to about 180° C., or about 130° to about 160° C. In another example, the structure can be subjected to pressure during molding in a range of about 0.1 megapascal (MPa) to about 1 MPa, about 0.15 to about 0.8 MPa, or about 0.2 to about 0.6 MPa.

The molding process can form areas of varying thickness in the structure that selectively reduces thickness of the core material. In the embodiments that include a honeycomb as the core material, sections of the honeycomb core can be crushed or partially crushed where thickness is reduced. In one or more embodiments, it is desirable to utilize a thermoplastic material as the core material. For example, a thermoplastic core material can be melted under heated mold conditions and varying thickness can be achieved without changing the integrity of the material.

In one or more embodiments, the composite structure can be trimmed and polished after being molded to remove any undesirable surface imperfections, for example, a burr or raised edge or piece of material left on the structure. Burrs or imperfections can be manually or mechanically removed, for instance, mechanically grinding or sanding the surface of the structure. Subsequent to a trimming step, if needed, the composite structure can be cleaned to remove debris or any excess material from the surface. Cleaning can be carried out with conventional methods, for example, pressurized gas or air can be blown on the structure to dislodge debris, such as dust or particles, that is adhered to the surface. The composite structure can also be brushed or wiped to remove unwanted material. In another example, the structure can be brought into contact with a cleaning solution, which can dissolve residue (e.g., release agents) from the surface of the structure. For instance, an aqueous solution with a cleaning agent (e.g., a surfactant) can be used. A cleaning solution can applied to the surface of the composite structure by any suitable method such as spraying, dipping or brushing.

The steps of trimming and cleaning prepare the composite structure for downstream processes if desired. In some embodiments, the composite structure can have additional coatings applied to its surface, such as an overcoat or protective coating. In other embodiments, the composite structure can be painted for its final application, for example, as a vehicle body panel or body component.

In one embodiment, the manufacturing methods can be carried out in a series of robotic work cells or manufacturing stations. In a first cell, a blank or biscuit is formed by sandwiching a core material (e.g., honeycomb or thermoplastic material) between two face sheets (fiber layers) and, optionally, an initial layer of thermoset resin is applied to the face sheets. The face sheets can contain fiber or be a fiberglass material. In a second cell, reinforcement material can be applied at one or more select areas onto the face sheets, for example, wetted face sheets. Reinforcement material can include unidirectional glass, aramid, carbon fiber or a combination thereof. In a third cell, thermoset resin is applied to the reinforcement material sections, or alternatively, to the entire face sheets to embed the reinforcement material and/or face sheets in the resin material. The reinforced pre-form composite is molded in a low-pressure, heated press using a steel or aluminum tool. In a fourth cell, the composite structure is trimmed to a final shape if needed and one or more fasteners are applied to edge areas for facilitating attachment to another composite structure to form a modular composite structure.

In another example method, a series of robotic cells are used to form a composite structure. In a first cell, a sheet of fabric is constructed, for example, a thermoplastic glass mat. For instance, sheet fabrics can be stitched together, which can be thermoplastic materials that can be locally welded. In a second cell, reinforcement material is selectively applied to areas on the sheet of fabric. Reinforcement material can include unidirectional glass, aramid, carbon fiber or a combination thereof. In a third cell, charges of a long fiber molding compound are applied in locations where core material is desired. The molding compound is applied in sufficient quantities for forming ribs of core material that can accommodate the addition of integral fasteners if desired. In a fourth cell, the pre-form composite is heated (e.g., rapid heating with IR energy) and then molded to a final shape in a heated, pressure mold. In a final step, trimming of the composite structure is completed if needed and one or more fasteners are added to facilitate attachment to another composite structure.

Turning to the figures, FIG. 1 shows a modular composite structure 40 that includes three individual composite structures 10, 20, 30 attached to one another. Structure 40 can be a component of a vehicle such that structure 40 is secured to other portions or parts of a vehicle, for example, a frame structure. As shown, composite structures 10 and 30 can be floor pan segments for a passenger vehicle. Structures 10, 30 have cores 12, 32 arranged between two fiber layers. The cores 12, 32 can extend in a central area of the composite along its entire length as shown.

In one or more embodiments, the cores (e.g., 12) of the individual composite structures can be a plurality of open or gas-filled cells defined by cell walls. The cells can have any suitable cross-section shape (e.g., circular, hexagon, square, etc.). For example, the core can be a honeycomb structure that includes many individual open cells side by side and arranged in the composite structures such that the cell walls are perpendicular to the longitudinal axis of the composite structure or an adjacent fiber layer. Alternatively, the cell walls can be arranged at other angles, for example, parallel or angled relative to the longitudinal axis of the composite structure. The cell walls can be made of plastic, for example, a thermoplastic or thermoset material. In one example, polypropylene or polycarbonate can be used as the material for the core and/or cell walls. The plurality of cells can be molded to form a desired shape wherein a portion of the cells are deformed under pressure, and optionally heat, to reduce the initial thickness of the core material.

In one or more embodiments, the core can be a non-cell material and composed any suitable thermoplastic material. Examples of thermoplastic materials include, but are not limited to, polypropylene and polycarbonate. The thermoplastic core can be a solid structure without openings such as cells. The thermoplastic core material can be molded under moderate heat and pressure to soften the material and form it into the desired shape having varying thickness. In one example, the thermoplastic material is heated above its glass transition temperature in a molding process to form the desired shape of the structure. The thermoplastic material can be heated, for example in a mold, to have a temperature in the range of about 100° to about 200° C., about 110° to about 190° C., about 120° to about 180° C., or about 130° to about 160° C. After forming the desired structure shape of the core, the thermoplastic material can be cooled to room temperature. In one or more embodiments, the average thickness of the core can be in the range of about 5 to about 250 millimeters (mm), about 5 to about 100 mm, or about 10 to about 50 mm.

The core is preferably easily moldable to arrive at the desired shape for the composite structure. In one or more embodiments, the core can have regions of different thicknesses and angles along its length. As shown, cores 12, 32 have a generally uniform thickness along its length with each end being pinched or crushed during molding to have a reduced thickness section. The floor pan cores 12, 32 each have a central area of increased thickness that is about 1.5 to 3 times thicker than the thickness of the core material nearby on each side. The central area of increased thickness can be a raised hump or ridge that runs along the length of the core and has a substantially horizontal section as opposed to a sharp peak. The central area of increased thickness imparts stiffness to the core to resist bending and torsion forces that may be applied to a floor pan during operation and assembly.

FIG. 1 also shows a utility tunnel 20 composite structure. The core 22 material of the utility tunnel 20 has a substantially uniform thickness molded into a U-shape having horizontal end sections or lips for attachment to other composite structures. As shown, core 22 is partially crushed honeycomb cell material. The structure 20 has a horizontal or planar center section flanked on each side by substantially vertical sections that angle outward at about 5 to 20 degrees relative to the vertical axis of the structure 20, which is also shown for structure 60 in FIG. 5. The utility tunnel 20 can alternatively have other core materials, for example, foam, thermoplastic material, structures, matrix or lattice.

As shown, the core material can be a uniform material of a single, continuous design. In one or more embodiments, the core can be a segmented or non-continuous core that includes one or more core sections. The individual core sections can be loosely packed together and sandwiched between fiber layers to maintain the desired core shape. In another example, the core sections can be attached to one another by a conventional method, such as glue, adhesive, tape, mechanical fasteners (e.g., rivets) and the like. Core sections can be made of different materials and have different designs depending on the desired properties. For instance, core sections near areas of high vibration or sound can include vibration and sound dampening material (e.g., foam). Core sections near areas of significant geometric change or non-uniform shape can contain a crushable material that can be easily molded to conform to the contours of the composite structure shape, for example, at a bend or pinched area in the composite structure. The segmented arrangement of core sections can isolate energy imparted onto the composite structure to one area and prevent or reduce the ability of the energy to dissipate to other parts of the core or nearby vehicle parts or passengers therein.

The core material can have properties that provide an energy absorbing ability. For example, the core can be a low density, crushable core that deforms upon impact and yet retains mechanical integrity (e.g., stiffness) in normal operation. The open cells and cell walls of a honeycomb core can absorb impact energy as the cell walls collapse and break. Other materials that can absorb energy can include elastomers, thermoplastic material, foams (e.g., open cell, viscoelastic, etc.), paper (e.g., cardboard), or molded resins. These materials can be combined with the plurality of cells, for example, the cells or a portion thereof (e.g., select regions where vibration and/or noise attenuation or increased rigidity is desired) can be filled or partially filled with foams or elastomers. In other embodiments, the core material can reduce acoustic and structural vibration as compared to other conventional materials such as steel. In one or more embodiments, the core materials of the composite structures of the present disclosure can include a conducting fiber (e.g., electrical conducting) and/or a sensor, for example, for transmission of power or monitoring properties or behavior of the composite structure.

As shown in FIG. 1, a core 12 can be sandwiched between and in direct contact with fiber layers 13, 14. The fiber layers 13, 14 can contain continuous and/or discontinuous fibers embedded in a polymer material to form layers having a substantially uniform thickness. The fibers can be arranged together to form a sheet or mat that can be positioned on a core material.

The fibers can be entangled in a random pattern or in a more systematic design, for example, the fibers can be weaved together in the form of a woven fiber sheet. In other examples, the fibers can be loosely bundled together or pressed together into a mat to form a fiber sheet. A whole fiber sheet can be used to cover a core material surface (e.g., a top surface). Alternatively, strips or sections of fibers can be applied side by side in a segmented arrangement to cover a core material surface. Examples of fibers that can be used in the fiber layer include carbon fibers, glass fibers, plastic fibers, etc. In one example, an inexpensive fiberglass sheet can be applied to a first surface of a core material.

The fibers can be applied to the surface of a core material to cover an entire face surface of the core material or a portion thereof. Once the fibers are arranged on a core material, a polymer forming material or resin can be applied onto the fibers. The polymer forming material can penetrate and soak into the fibers arranged on the core material. As described herein, polymer forming material can be pushed and forced into the fiber layer to embed the fibers during a molding step, for example, a press or compression mold can push polymeric resin into the fibers to coat the fibers, fill voids in the fiber layer and contact the core material. A sufficient amount of polymer forming material can be applied to the fibers to form polymer layer that embeds the fibers and contacts the core material to adhere the fibers to one another and to the core. In one or more embodiments, the polymer can be formed from a curable polymer resin or composition. The composition can include a mixture of components, for example, a thermoset material, a thermoplastic material, a hardener, a catalyst, fillers, and any combination thereof. Materials can include epoxy, polyurethane, polyether ether ketone, polyethylene, or combinations thereof. The composition preferably has a low cure period in the range of 1 to 20 minutes, or less than 15, 10 or 5 minutes. The polymer forming material once cured can bond the fiber layer to the core material to form a laminate as the composite structure. The fiber layer preferably bonds or adheres to the core to prevent delamination or separation of the fiber layer from the core during use.

As shown in FIG. 1, the fiber layers 13, 14 cover all or a significant portion of the top and bottom surface faces of the core 12 of composite structure 10. Likewise, composite structure 30 has a similar arrangement in that fiber layers 33, 34 directly cover the top and bottom surface faces of core 32. In both composites 10, 30, the two end faces of the cores 12, 32 are exposed. In an alternative arrangement, the fiber layers can extend past the ends of the top and bottom surfaces of the cores to overlap each core end to encase the core material. The utility tunnel structure 20 also contains a top and bottom fiber layer 23, 24 that respectively cover and are in direct contact with the top and bottom surfaces of core 22.

The composite structures of FIG. 1 each have a single fiber reinforcement region that overlies select surface portions of the cores. In composite structure 10, a fiber reinforcement region 16 is arranged over the central area of increased thickness of core 12. The fiber reinforcement region 16 entirely covers the substantially horizontal section of the central area and further extends over the substantially vertical sections on each side. In a similar arrangement, fiber reinforcement region 36 covers the substantially horizontal section of the central area of core 32, along with portions of the substantially vertical sections on each side. The utility tunnel structure 20 has a fiber reinforcement region 26 positioned at the center of the structure 20 and covering the horizontal center section of the U-shape. The fiber reinforcement region 26 extends slightly past the horizontal section of the utility tunnel to overlie the bend area that begins the transition to the substantially vertical sections on each side.

The fiber reinforcement regions provide additional strength and increased stiffness to select areas of the composite structures to resist bending and torsion forces. As shown in FIG. 1, the fiber reinforcement regions are positioned on the central areas of each composite and, in particular, the substantially horizontal sections of the central areas. Selectively positioning the fiber reinforcement regions along the horizontal center sections provides increase stiffness at the central mass of the composite, which in the case of composites 10, 30 is the area of the maximum core thickness. The reinforcement fiber regions can be positioned directly on the core material or directly on the fiber layer that overlies the core material. Composites 10, 30 have the fiber reinforcement regions 16, 36 directly in contact with the top surface of the cores 12, 32, whereas composite structure 20 has a single fiber reinforcement region positioned directly on top of fiber layer 23 that overlies core 22.

The fiber reinforcement regions can be applied in the above described method for the fibers in the fiber layers. In one example, the fiber reinforcement can be in the form of a patch, tape, strip or lane that is applied to the core or fiber layer. The fiber reinforcement regions can be symmetric or non-symmetrical (i.e. asymmetric) across the surface of the core material or fiber layer. For instance, the fiber reinforcement region may have sections of different widths or thicknesses across its surface. In one or more embodiments, the central areas or ridges of increased thickness of the composite structures can be a non-straight region that angles or curves along the length or width of a composite structure. To follow the central area (e.g. raised to topmost point) or ridges of increased thickness, the fiber reinforcement regions can be non-symmetrical in shape that can conform to the contours of the areas to be reinforced.

The fiber reinforcement regions (e.g., 26, 36) can be made of carbon fibers, glass fibers, aramid fibers and the like or combinations thereof. The fibers can have any suitable length and can be supplied in bundles of unidirectional fibers. The length of the fibers can be substantially equal to one another or vary such that the lengths are random throughout the reinforcement region. The length of the fibers is preferably greater than 50 mm to impart increased stiffness to select areas of the composites. The reinforcement fibers can be arranged in a variety of ways, for example, in a unidirectional/aligned or woven (e.g., basket weave) pattern. Multiple layers of unidirectional fibers can be used, for example, each layer of unidirectional fibers can be arranged at a parallel, angled or perpendicular position relative to an underlying fiber reinforcement layer. Alternatively, the fibers can be discontinuous (e.g., fibers of different lengths) and appear as a random or non-uniform pattern.

The fiber reinforcement regions can be positioned on a fiber layer or core material in a variety of ways. In one or more embodiments, unidirectional fibers can be applied onto a substantially horizontal central area (e.g., an area of increased thickness) of a composite structure such that the unidirectional fibers are laid perpendicular to the length of the central area or ridge. In other embodiments, the fibers can be applied to lay parallel or angled (e.g., a 45 degree angle) to the length of a substantially horizontal central area. In other embodiments, randomly oriented discontinuous fibers can be applied in any direction to reinforce select areas of the composite structures.

As applied to a fiber layer or core material, a curable material can be applied onto the fiber reinforcement region or regions. The curable material can be the same curable material used to embed the fibers of the fiber layers, for example, fiber layers 13, 14. For instance, materials can include a mixture of components, for example, a thermoset material, a thermoplastic material, a hardener, a catalyst, fillers, and any combination thereof. Curable materials can include epoxy, polyurethane, polyether ether ketone, polyethylene, or combinations thereof. The curable material (e.g., resin) can be sprayed, poured, spread, rolled, brushed or calendared onto the fiber reinforcement region to embed or the fibers in the curable material to form a pre-form composite. Under heated conditions, the pre-form composite can be molded (e.g., in a compression) mold to form the final shape of the composite structure.

As formed, the composite structures can be attached or joined together to form a modular composite structure. As shown in FIG. 1, composite structures 10, 30 are adhered to each end of composite structure 20 with an adhesive 2. Any suitable adhesive can be used, for example, an epoxy. The adhesive is applied to an outer surface of a composite structure, for example, an exposed surface of fiber layer 24 or 13. It is preferable that the composite structures are permanently attached to one another to ensure structural integrity of the modular composite structure during use. Although not shown, other fasteners can be used in place of an adhesive, for example, a screw, snap fitting, rivet, clamp, bolt or clip.

An attachment device, fastener or component thereof can be molded into or onto the composite structures to accommodate attachment or anchoring to another structure, such as the frame or body of a vehicle or adjacent composite structure. One or multiple attachment devices, fasteners or components thereof can be molded with the composite structure and any desirable location, for example, near or at an end region. As an insert, one or more attachment devices or components can be positioned between a core material and a fiber layer or skin and molded with the composite structure to provide an attachment area for securing a composite to another structure. In an example, a fastener component can positioned on the core material prior to applying fibers and resin to the surface of the core to arrange the fastener component as an composite structure insert. As an onsert, an attachment or fastener, or component thereof, can be positioned on the surface of a fiber layer (e.g., 24, 13) or fiber reinforcement region (e.g., 26, 16) overlying the core material such that the attachment device or component is formed on the outer surface of the composite structure. The use of an insert or onsert attachment component can reduce the need for adhesives for securing the composite structures to other parts.

Figure 2:
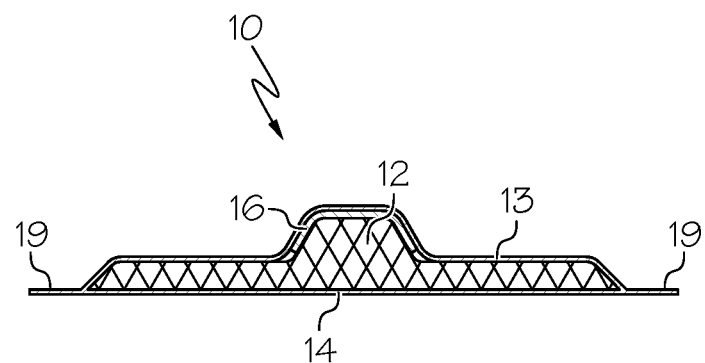
FIG. 2 shows a cross-section view of a structural composite of a vehicle floor pan.
Figure 3:
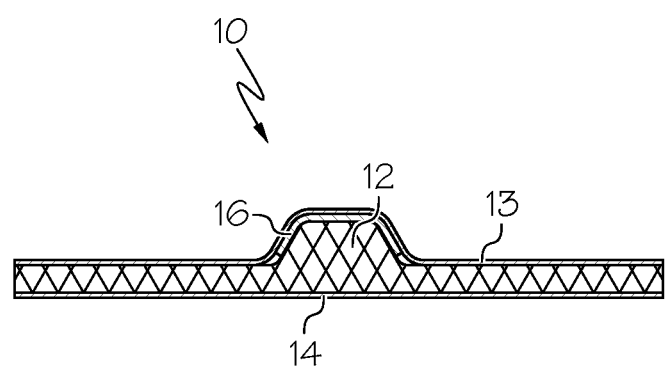
FIG. 3 shows a cross-section view of a structural composite of a vehicle floor pan.

In FIGS. 2 and 3, various embodiments of a composite structure are shown. In FIG. 2, the composite structure 10 includes a core 12 sandwiched between two fiber layers 13, 14 as described in FIG. 1 above. A fiber reinforcement region 16 is arranged between fiber layer 13 and the core 12 at the central area of the composite 10. Each end of the composite structure 10 includes a region devoid of core material such that both fiber layers 13, 14 extend past the core and contact one another to form an end region that includes only a laminate fiber layer 19. The end fiber layer 19 provides a rigid and solid region that can be used to anchor or attach the composite structure 10 to another part or structure. In another embodiment, as shown in FIG. 3, the composite structure 10 can have the core 12 extending to both ends of the structure between the fiber layers 13, 14. In contrast to the composite structure of FIG. 1, the core 12 is not partially crushed at each end but rather has a uniform thickness. As shown, the core material, along with both fiber layers 13, 14, are open and exposed at each end of the composite structure 10. Although not shown, the end regions of the composite structures of FIGS. 2 and 3 can include an adhesive or attachment means as described above for securing the structures to other parts or composites.

Figure 4:
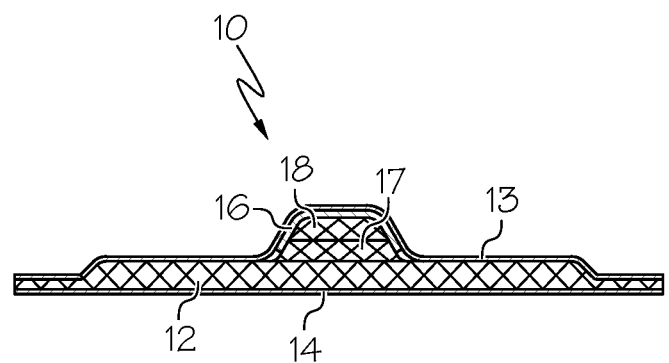
FIG. 4 shows a cross-section view of a structural composite of a vehicle floor pan.

FIG. 4 shows another embodiment of a composite structure. The composite structure 10 includes fiber layers 13, 14 that sandwich a stacked core. As shown, the core is split into three layers. The lower core 12 extends along the entire length of the composite structure 10 with both ends of the lower core 12 being partially crushed to form thinner end regions that can be attached to other structures. The fiber layers 13, 14 are in direct contact with the upper and lower surfaces of the lower core 12 except for the central area of increased thickness. The central area of increased thickness of the composite structure 10 is formed by additional cores 16, 17 stacked together on top of the lower core 12. The middle core 17 overlies the lower core 12 and the upper core 16 overlies the middle core 17 to form a localized area of increased thickness at the center of the structure 10. As shown, a fiber reinforcement region 16 overlies the upper core 16 and a portion of the middle core 17. The upper fiber layer 13 overlies the fiber reinforcement region to form the upper surface of the structure. The middle and upper cores 16, 17 can be composed of the same material as the lower core 12 or, optionally, the cores 16, 17 can be made of different materials. The multiple cores can be directly stacked on one another without intermediate layers or materials in between. In one or more embodiments, the cores can be adhered together with a conventional adhesive to ensure the cores are secured in place.

Figure 5:
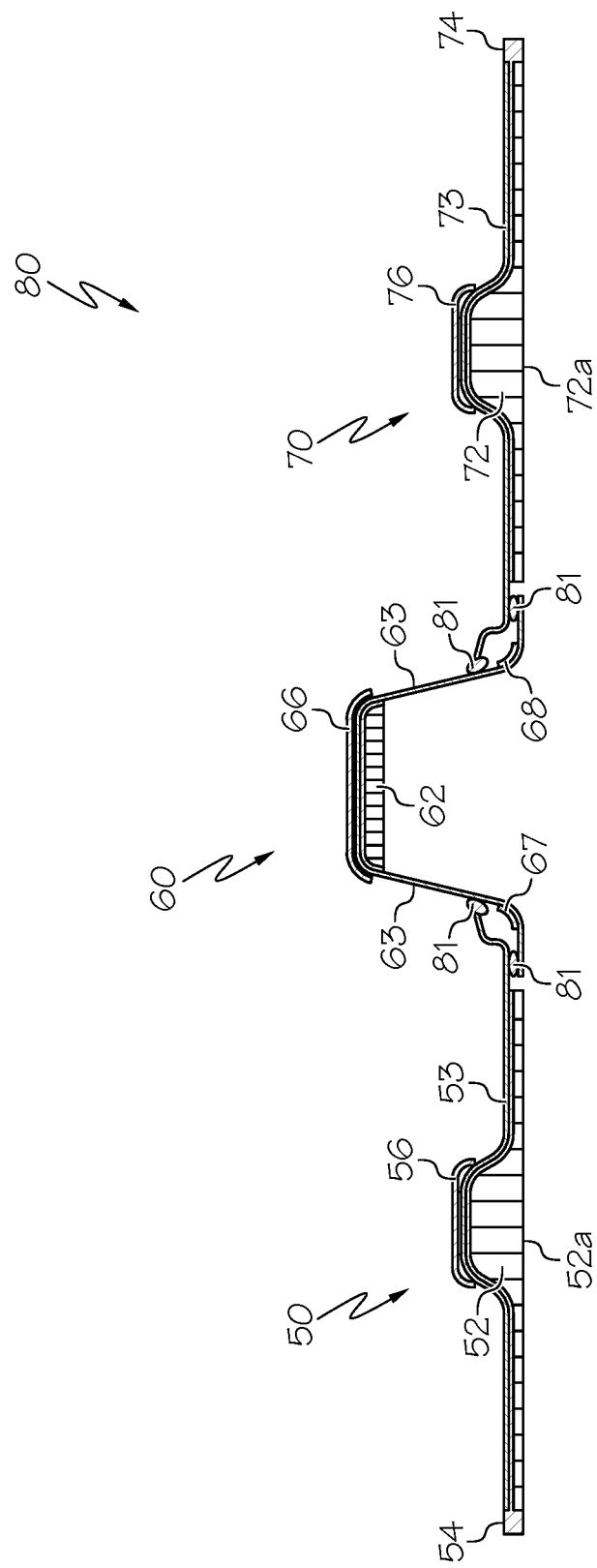
FIG. 5 shows a cross-section view of a modular structural composite of a vehicle floor pan with a transmission tunnel.

As used herein, localized areas of increased thickness of the composite structures can be accomplished with multiple cores stacked together. Any number of cores can be used, for example, 2 to 10, 3 to 8 or 4 to 6 cores can be stacked together to form a central area having increased thickness in the composite structures. The cores can be any type (e.g., honeycomb, foam) and made of materials as noted above, for instance, plastic, paper, viscoelastic foam, etc. In one or more embodiments, A second modular composite structure 80 is shown in FIG. 5. The modular composite structure 80 contains three composite structures 50, 60, 70 attached to one another. Composite structures 50 and 70 are floor pan segments and composite structure 60, which separates the floor pan segments, is a U-shaped utility tunnel, for example, that can be used to house a transmission component.

Composite structure 50 has a ribbed core 52 with a top surface covered and in direct contact with fiber layer 53. Fiber layer 53 extends past one end of ribbed core 52 and forms an attachment section for joining composite structure 50 to another composite structure (e.g., structure 60). As shown, fiber layer 53 extends to the end of the ribbed core 52 at the opposite end not attached to composite structure 60. At one end, the ribbed core 52 has an end cap 54. Providing one or more end caps on the ends of a composite structure can reduce or eliminate additional trimming to remove debris or barbs after a molding step. The end cap also functions to protect the fiber layer edges and core material exposed at the ends of the composite structure. In one or more embodiments, the end cap 54 can be made of the same material used to form the ribbed core 52, for example, a thermoplastic sheet forming material. The end cap can be formed by building up a block of thermoplastic material (e.g. polypropylene, polyethylene terephthalate, polybutylene terephthalate) at one or more ends of the composite structure prior to a molding step. The thermoplastic material can contain dispersed or arranged fibers as described above, for example, glass fibers. Chopped or short fibers can be blended with thermoplastic material or longer fibers can be used compounded in the material.

In an embodiment, the end cap 54 can be formed by a conventional method, for instance, in a direct fiber thermoplastic molding process. In the process a thermoplastic material can be compounded with fibers and then molded together. In a direct long fiber thermoplastic molding operation, the length of the fibers being mixed with the thermoplastic material can be controlled. In an example, the thermoplastic compound can be mixed in the barrel of an injection machine and heated to melt the compound where long glass fibers are pulled through a die and coated or impregnated with the thermoplastic material. The extruded part of reinforced material can be chopped or pelletized and used to build up an end cap for molding with the composite structure.

As shown, the bottom surface 52a of ribbed core 52 in FIG. 5 is exposed and not covered by other materials. Ribbed core 52 has a humped central area with an increased thickness. The central area has a substantially horizontal section flanked by two angled side faces. A fiber reinforcement region 56 overlies fiber layer 53 and covers the substantially horizontal area of the central area of increased thickness of ribbed core 52. The fiber reinforcement region 56 extends slightly past the horizontal section of the central area to overlie the bend area that begins the transition to the angled sections on each side. Fiber layer 53 and fiber reinforcement region 56 can be embedded in a polymer forming composition as discussed above for the fiber layers and fiber reinforcement regions shown in FIG. 1.

Composite structure 60 of FIG. 5 has a single fiber layer 63 that forms the entire U-shape of the utility tunnel structure. Fiber layer 63 has a substantially horizontal section at its center, which is positioned between two substantially vertical sections that each end with a horizontal lip for attaching the utility tunnel to one or more other composite structures (e.g., 50, 70). The bottom surface of the substantially horizontal center section of fiber layer 63 is bonded to or adhered to ribbed core 62, which spans across the entire bottom surface of the substantially horizontal section and into the bend areas of fiber layer 63 that transition into the substantially vertical sections. The ribbed core 62 has a bottom surface that is not covered by a material and is exposed to the open utility area of structure 60.

Composite structure 60 further has three fiber reinforcement regions 66, 67 and 68. The fiber reinforcement regions can be made up of fibers and materials, as well as arrangement thereof, as discussed above for the composite structures of FIG. 1. As shown, fiber reinforcement region 66 covers and directly contacts the substantially horizontal section of fiber layer 63 of utility tunnel 60, and along with a portion of the bend areas of fiber layer 63 that transition into the vertical sections on each side. Fiber reinforcement regions 67 and 68 are positioned directly on fiber layer 63 at the bend areas at the bottom of the substantially vertical sections and the start of the two horizontal lip sections. On one side of structure 60, near both sides or ends of fiber reinforcement region 67, one end of fiber layer 53 is attached with an adhesive 81 to the substantially vertical section of fiber layer 63. At the one end of fiber layer 63, an adhesive 81 secures composite structure 60 to a bottom surface of fiber layer 53 near the end of ribbed core 52. Likewise, on the opposite end of structure 60, near both sides or ends of fiber reinforcement region 68, one end of fiber layer 73 is attached with an adhesive 81 to a substantially vertical section of fiber layer 63. An additional adhesive 81 secures an end of fiber layer 63 to a bottom surface of fiber layer 73 near an end of ribbed core 72. The attachment of the three composite structures forms the modular composite structure 80. Attachment of the composite structures can optionally be achieved with conventional fasteners, for example, the ends of the structures can be molded with a fastener or fastener component to facilitate attachment to other composite structures or the body or frame of a vehicle.

Composite structure 70 has a ribbed core 72 with an exposed bottom surface 72a not covered by other materials and a top surface (e.g., a first surface) entirely covered by and in direct contact with fiber layer 73 along its entire length. Ribbed core 72 has a humped central area with an increased thickness. The central area has a substantially horizontal section flanked by two angled side faces. A fiber reinforcement region 76 overlies fiber layer 73 and covers the substantially horizontal area of the central area of increased thickness of ribbed core 72. The fiber reinforcement region 76 extends slightly past the horizontal section of the central area to overlie the bend area that begins the transition to the angled sections on each side. At one end, fiber layer 73 extends past the end of ribbed core 72 and forms an attachment section (e.g., use of adhesive 81) for securing the structure 70 to another composite structure. As noted above, fiber layer 73 and fiber reinforcement region 76 can be embedded in a polymer forming composition as discussed above for the fiber layers and fiber reinforcement regions shown in FIG. 1. At the opposite end of structure 70, the fiber layer 73 extends to the end of the ribbed core 72 and terminates into an end cap 74. End cap 74 can be formed from thermoplastic material, optionally with fibers, as noted above with respect to end cap 54.

The ribbed cores of modular structure composite 80 can be made from thermoplastic material that can be molded into a desired shape. Preferably, the ribbed core achieves an equivalent stiffness with less expensive materials as compared to conventional composite laminate constructions. The thermoplastic material or resin used for the ribbed cores can be molded at low or moderate pressure under heat. For example, thermoplastic material in the form of long fibers (e.g., loosely tangled fiber material) can be applied to a fiber mat (e.g., a fiberglass mat or glass mat thermoplastic) that forms the fiber layer of the composite. The long fibers of thermoplastic material can be molded into a desired core shape in a press along with curing of the fiber layer and bonding to the formed core shape. In addition to a ribbed design, the core material can be molded into other shapes as desired, for example, lattice or coffered array of open shapes (e.g., rectangular or square). As part of the molding step, not shown, one or more fasteners can be integrated into the core or fiber layer to facilitate attachment of the structure to other composite structures.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A modular composite structure for a vehicle floor pan section comprising:
   a. a first molded composite core structure comprising
      i. a first core comprising a first surface, the first surface of the first core bonded to a first fiber layer embedded in a first polymer;
      ii. a first fiber reinforcement region overlying a portion of the first surface of the first core;

b. a second molded composite core structure comprising
   i. a first fiber substrate, the first fiber substrate comprising fibers embedded in a second polymer, the first fiber substrate bonded to a first surface of a second core;
   ii. a second fiber reinforcement region bonded to and overlying a portion of the first fiber substrate;
wherein the first molded composite core structure is attached to the second molded composite core structure to form a vehicle floor pan section.

2. The modular composite structure of claim 1, wherein the first molded composite core structure comprises a central area of increased thickness along its length, and the first fiber reinforcement region overlies the central area of increased thickness of the first molded composite core structure.

3. The modular composite structure of claim 2, wherein the central area of increased thickness comprises an additional core overlying the first core.

4. The modular composite structure of claim 1, wherein the first fiber reinforcement region is embedded in the first polymer and the second fiber reinforcement region is embedded in the second polymer.

5. The modular composite structure of claim 1, wherein the first fiber reinforcement region overlies the first fiber layer, and a portion of the first fiber layer is in direct contact with the first core.

6. The modular composite structure of claim 1, wherein the first fiber layer overlies the first fiber reinforcement region such that a portion of the first fiber reinforcement region is in direct contact with the first core.

7. The modular composite structure of claim 1, wherein the modular composite structure comprises a third molded composite core structure, the third molded composite core structure being attached to the second molded composite core structure such that the second molded composite core structure separates the first and the third molded composite structures.

8. The modular composite structure of claim 1, wherein the second molded composite core structure is a U-shaped utility tunnel for a vehicle floor pan.

9. The modular composite structure of claim 1, wherein the first core is segmented, the first core comprising a first core section and a second core section.

10. The modular composite structure of claim 1, wherein the first core structure is a ribbed core, wherein the ribbed core comprises a free second surface not in contact with a fiber layer.

11. The modular composite structure of claim 1, wherein the ribbed core comprises a molded thermoplastic resin.

12. The modular composite structure of claim 1, wherein the first core is a solid thermoplastic material.

13. The modular composite structure of claim 1, wherein the second molded composite core structure comprises a horizontal center portion and two substantially vertical portions on each side of the horizontal center portion.

14. The modular composite structure of claim 13, wherein the second fiber reinforcement region extends to overlie a portion of the two substantially vertical portions.

15. The modular composite structure of claim 13, wherein the second molded composite core structure comprises a first end and a second end, the first end of the second molded composite core structure attached to the first molded composite core structure.

16. The modular composite structure of claim 1, wherein the first molded composite core structure comprises a central area of increased thickness along its length, the central area of increased thickness comprises a horizontal surface portion and two substantially vertical surfaces on each side of the horizontal surface portion, the first fiber reinforcement region overlies the horizontal surface portion of the central area of increased thickness.

* * * * *